United States Patent [19]
Brenden

[11] 3,802,533
[45] Apr. 9, 1974

[54] IMPROVEMENTS IN AND RELATING TO ULTRASONIC LENSES

[75] Inventor: Byron B. Brenden, Richland, Wash.

[73] Assignee: Holotron Corporation, Wilmington, Del.

[22] Filed: Mar. 11, 1971

[21] Appl. No.: 123,190

Related U.S. Application Data

[60] Division of Ser. No. 730,260, May 20, 1968, Pat. No. 3,585,847, which is a continuation-in-part of Ser. No. 710,991, March 6, 1968, abandoned.

[52] U.S. Cl.............. 181/.5 NP, 340/8 L, 340/5 H, 187/.5 R
[51] Int. Cl............................................. G01v 1/16
[58] Field of Search...... 181/.5 AC, .5 NP; 540/8 L, 540/5 H; 181/.5 R

[56] References Cited
UNITED STATES PATENTS
2,300,251  10/1942  Flint................................... 340/8 L
3,620,326  11/1971  Hogge................................. 340/8 L
3,168,659  2/1965  Bogre et al......................... 340/8 L

OTHER PUBLICATIONS

"Variable Focus Liquid–Filled Hydroacoustic Lens," Knollman, Bellin & Weaver, Journal Acoustical Society of America, p. 253, August 14, 1970.

Primary Examiner—Samuel Feinberg
Assistant Examiner—J. V. Doramus
Attorney, Agent, or Firm—Woodcock, Washburn, Kurtz & Mackiewicz

[57] ABSTRACT

The present invention relates to ultrasonic or acoustic lenses, and has particular reference for lenses suitable for use in ultrasonic holographic imaging methods and apparatus.

9 Claims, 28 Drawing Figures

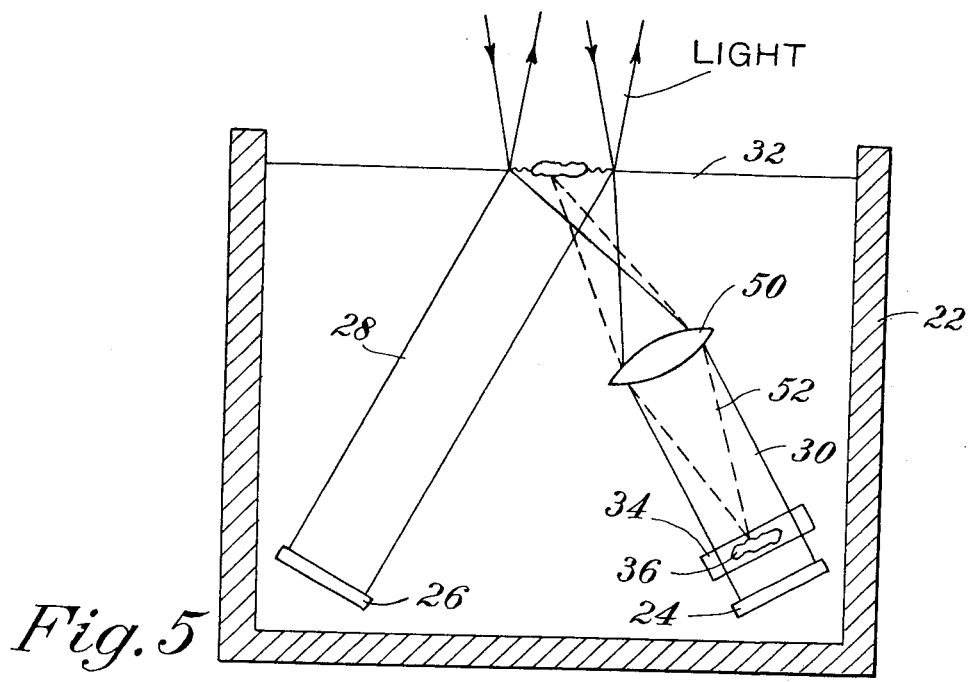
Fig.5
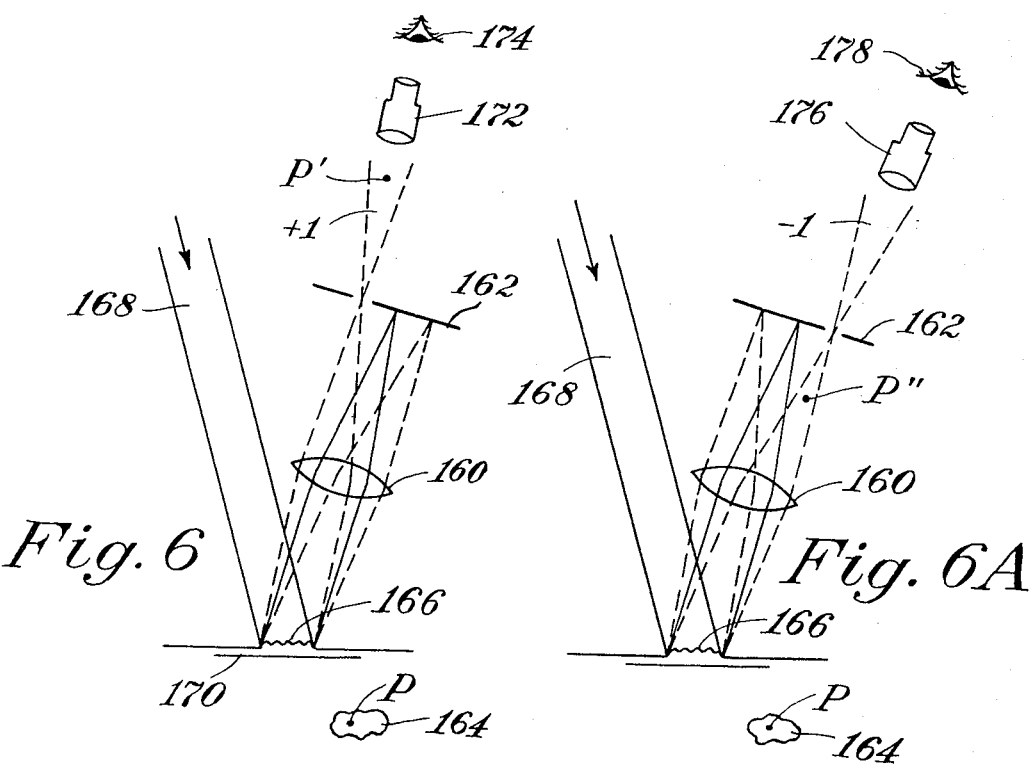
Fig.6
Fig.6A

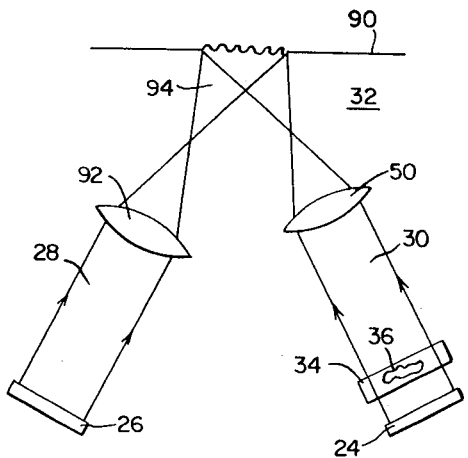
Fig. 8
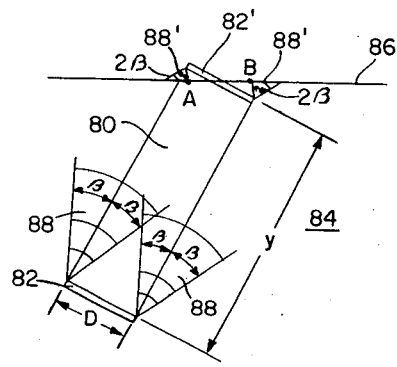
Fig. 7
Fig. 9
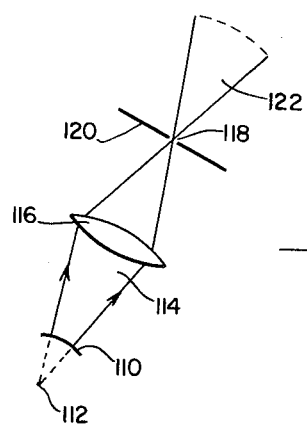
Fig. 10

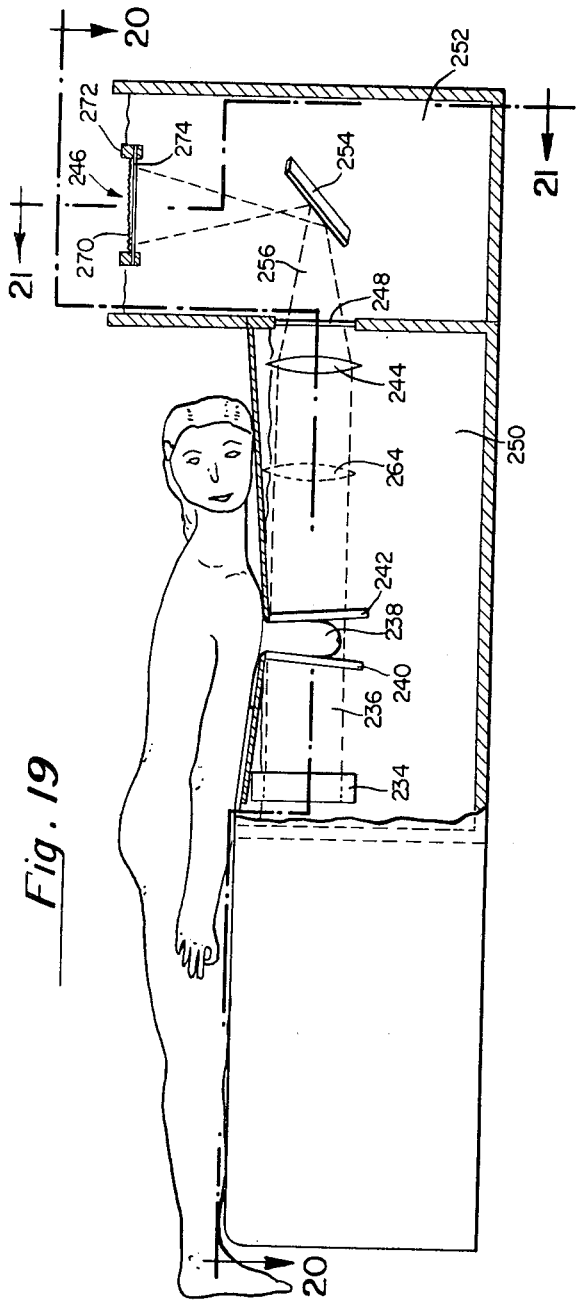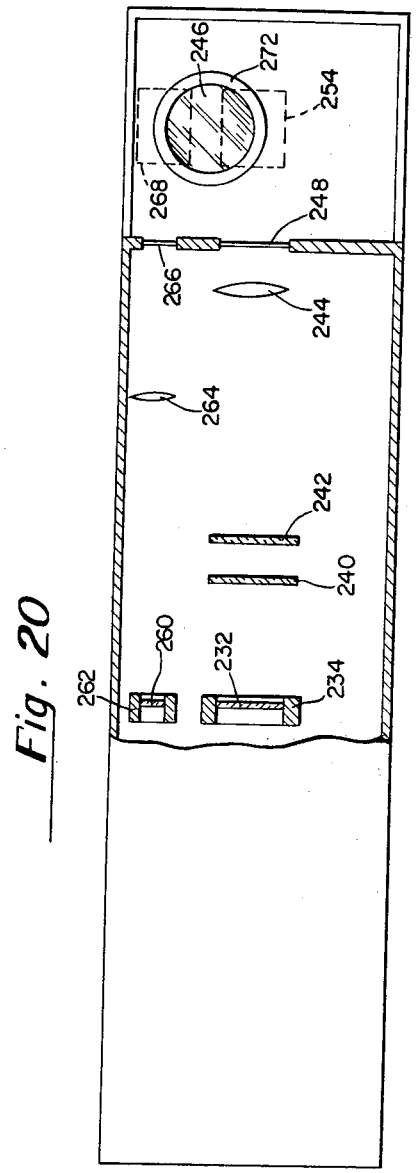

IMPROVEMENTS IN AND RELATING TO ULTRASONIC LENSES

CROSS-REFERENCE TO RELATED APPLICATION

This application is a division of copending application Ser. No. 730,260, filed May. 20, 1968, now U.S. Pat. No. 3,585,847, which in turn is a continuation-in-part of application Ser. No. 710,991, filed Mar. 6, 1968, by Byron B. Brenden, now abandoned. Certain inventive features disclosed in the present application are claimed in divisional application Serial No. 123,191 filed March 11, 1971 which issued October 16, 1973 as Patent No. 3,765,403.

BACKGROUND OF THE INVENTION

This invention relates generally to ultrasonic imaging systems and more specifically to improvements in the method and apparatus used in the art of ultrasonic imaging.

Many testing techniques involving ultrasonic techniques are being used. Ultrasonic imaging utilizing pulse-echo techniques for two-dimensional imaging of an object under inspection is one well-known technique. The time delay and intensity of the reflection of successive ultrasonic energy pulses scanned across an object are put together to map out the internal structure of an object. This technique is more fully described elsewhere, such as by Carlin, *Physical Acoustics*, Vol. 1, Part B, page 52, edited by Mason (1964).

Direct ultrasonic imaging in two-dimensions also has been applied to materials testing. A beam of ultrasonic energy is passed through an object under investigation and then to an area detector which is illuminated with light to render an image of the transparency of the object to ultrasound. If there is some internal defect in the object, its image will be projected onto the area detector and thus made visible in two dimensions. If an ultrasonic lens is placed between the object and area detector to image the ultrasonic field passing through the object onto the area detector, a better image is obtained of the flaw. One example of this technique is described by Hueter and Bolt in Sonics, page 353, published by Wiley in 1955.

For certain object inspections, it is desirable to be able to inspect the internal structure of an object as seen in three dimensions by ultrasound passing through it. This result is obtained by recent improvements in the techniques of ultrasonic imaging which make use of the phenomenon of wavefront reconstruction or holography. In a preferred form of ultrasonic holography, a standing wave pattern comprising a hologram is formed at an area detector in a fluid medium by the interference created between two ultrasonic beams, each at substantially the same ultrasonic frequency, and directed to the area detector at a finite angle therebetween. One of the ultrasonic beams is caused to pass through an object under inspection and therefore its wavefront contains information of the object and any internal flaws or defects therein. This information is transferred to the standing wave pattern by introducing the second ultrasonic beam (reference beam) to interfere with the object beam, somewhat analogous to the interference in light holography. The standing wave pattern (ultrasonic hologram) can then reflect light into various diffracted orders and an image, either actual or conjugate, of the original object can be viewed by positioning suitable viewing optics focused on the desired image in either of the two first order diffracted beams, respectively.

The principles of ultrasonic holography are described and claimed in copending patent application Ser. No. 569,914, filed Aug. 3, 1966. An improved method of ultrasonic holography in which objects can be viewed in different colors according to variations in the density of an object is described and claimed in copending patent application Ser. No. 691,253, filed Dec. 18, 1967, now U.S. Pat. No. 3,564,904.

It is an object of this invention to provide an ultrasonic lens and a method for construction thereof for improved imaging of an ultrasonic field from one plane to another.

SUMMARY OF THE INVENTION

According to the present invention, ultrasonic lenses are preferably thin lenses constructed with two thin, flexible membranes prestretched across a frame to form a cavity which is filled with a sound refracting liquid and includes means for controlling the volume of the liquid in the cavity, thereby controlling the shape of the lens and its focal length.

While the scope of the invention is defined in the appended claims, this invention may be best understood by reference to the following description of the preferred embodiments taken in conjunction with the accompanying drawings.

BRIEF DESCRIPTION OF THE DRAWINGS

FIG. 5 illustrates another embodiment of an improved holographic imaging technique which also utilizes an ultrasonic lens in the object beam;

FIGS. 6 and 6A illustrate an improved holographic imaging system when a spatial filtering system is utilized in the optical domain;

FIG. 7 illustrates the problem of edge effects from a quartz transducer in the reference beam;

FIG. 8 shows the use of an ultrasonic lens for imaging a reference beam transducer onto an area detector for making a hologram;

FIG. 9 illustrates the use of an ultrasonic lens and pinhole filter to produce an improved reference beam for use in ultrasonic holography;

FIG. 10 shows the use of an ultrasonic lens and pinhole filter with a spherical-shaped transducer to produce an improved reference beam for use in ultrasonic holography;

FIG. 19 shows ultrasonic mammography equipment which utilizes the techniques of holographic imaging;

FIG. 20 is a top view of FIG. 19 taken at section 20—20;

DESCRIPTION OF THE PREFERRED EMBODIMENTS

In the broadest sense, the sonic frequencies utilized in "ultrasonic imaging" are not limited to any particular range but include the entire spectrum of compressional wave energy. However, in the more practical embodiments of that technique, it has been found that the higher sonic frequencies (i.e., those considerably above the audible range) are more desirable than the lower sonic frequencies. For this reason, instead of utilizing the more general term "compressional wave energy", the term "ultrasonic energy" will be utilized in the following description. This should, however, in no way limit the scope of the invention.

Furthermore, the medium in which such ultrasonic energy is propagated is referred to in this description as a liquid, since materials in this class are preferred. However, this should not limit the scope of the invention, since any ultrasonic transmitting medium may be utilized which has the physical property which best serves the purpose of the particular embodiment.

Figure 1:
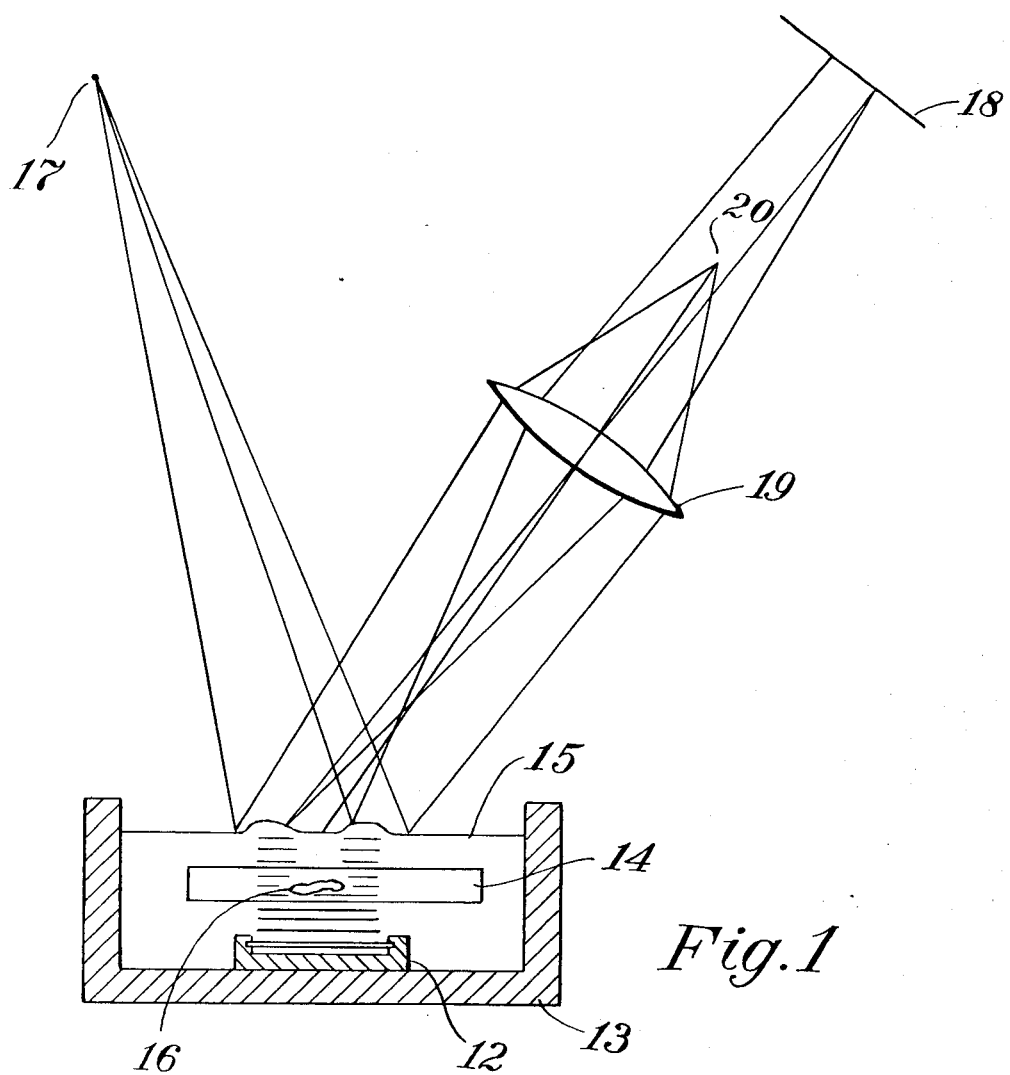
FIGS. 1 and 2 illustrate a method of two-dimensional ultrasonic direct imaging.

Visualization of ultrasonic wavefronts or fields passing through objects has previously been employed to study the properties of such objects and to determine the existence of flaws or defects. In applications where the imaging of the internal structure of objects is accomplished by the visualization of ultrasonic fields, the technique is similar to an X-ray technique, although the physical interactions of the ultrasound with the object is much different than the interaction of X-rays. Referring to FIG. 1, there is shown in diagrammatical form one arrangement utilized to image an internal flaw in a metal plate. Ultrasonic energy generated by an ultrasonic transducer 12 positioned within a liquid-filled tank 13 is transmitted through a metal plate 14 to the surface 15 of the liquid. A void or flaw 16 within the metal plate 14 is opaque to ultrasound and therefore modifies the ultrasonic beam transmitted from the ultrasonic transducer 12. At the surface 15 the ultrasonic energy creates a distortion pattern proportional to the intensity of the ultrasound and this distortion pattern constitutes an image of the interior of the metal plate, including the flaw 16. This ultrasonic image can be rendered in visible light by illuminating the surface 15 from a point source of light 17 and forming an image at plane 18 of that portion of the surface 15 illuminated by means of a lens 19. Light which is reflected from perfectly horizontal portions of the surface of the liquid and contains little desired information of the flaw 16, is focused by the lens 19 and blocked by a filter 20, thereby improving the clarity of the image.

Figure 2:
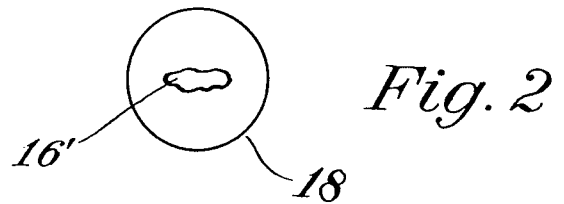

The intensity of the light in the image plane 18 does not correspond to the intensity of the ultrasound at the surface 15, but rather is proportional to the rate of change of the ultrasonic intensity at the surface 15. Therefore, the arrangement of FIG. 1 tends to show only the edges of the flaw 16 as illustrated in FIG. 2, which is a representation of the image plane 18 turned 90°. An image 16' illustrated in FIG. 2 is an outline of the flaw 16 rather than a true image of the same. Therefore, in the method illustrated in FIGS. 1 and 2, the image obtained from the utilization of a single ultrasonic beam and a liquid surface area detector does not contain a light intensity distribution which is proportional to the ultrasonic intensity distribution at the liquid surface.

There are several ultrasonic area detectors known in the art of direct ultrasonic imaging which will in certain circumstances produce an optical image which is a more faithful representation of the ultrasonic wavefront passing through the object than the liquid surface area detector shown in FIG. 1. For instance, one area detector is known as a Pohlman cell wherein specular reflecting flakes are suspended in a liquid contained between two windows. The cell is placed in the path of the ultrasonic beam after it passes through an object. The reflective flakes, often made of aluminum, are left free to orient themselves according to the direction of the ultrasonic wavefront passing through the detector, thereby to give an optical representation of the traveling ultrasonic wavefront. This detector is described basically by R. Pohlman in Z. Physik, 113,697 (1939), in an article entitled "On the Possibility of an Acoustic Image in Analogy to an Optical One".

Another direct imaging area detector is the ultrasonic camera which utilizes a quartz transducer in the path of the ultrasonic beam after passing through the object. The transducer is scanned by a electronic beam in a manner similar to that of a television picture tube. The electronic beam is modulated in intensity according to the charge on the transducer which in turn corresponds to the characteristics of the ultrasonic wavefront striking the transducer. A television display monitor may then be used to display an optical representation of the ultrasonic wavefront striking the transducer. More details of this type of detector may be had by reference to an article entitled "Ultrasonic Image Camera", Engineer, 207,348 (1959).

A third method of detecting ultrasound in a defined area is to scan the area with a substantially point ultrasonic sensitive transducer. The ultrasonic field may then be reconstructed in the optical domain according to the scanning pattern. This technique is disclosed more fully by Preston and Kruezer, Applied Physics Letters 10, 5, 150–152 (1967).

Figure 3:
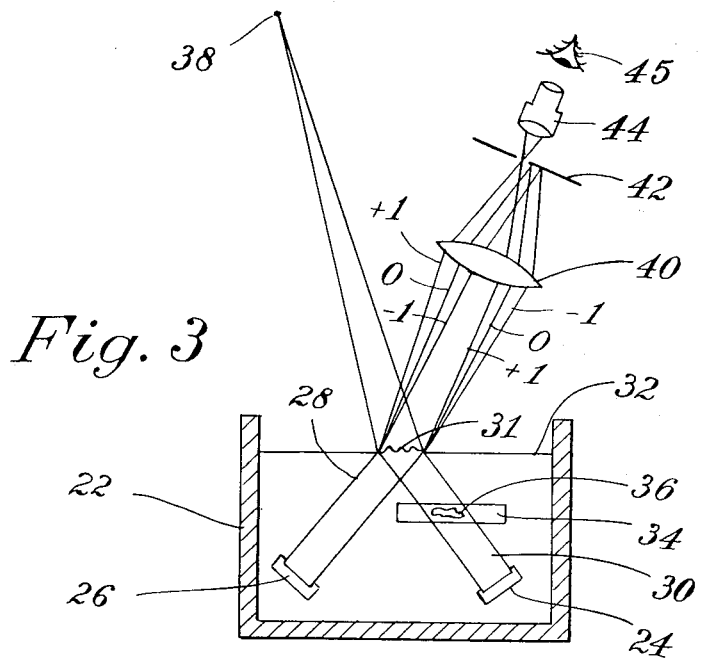
FIG. 3 shows apparatus useful in carrying out ordinary ultrasonic holographic image reconstruction and which is also useful in carrying out certain improved techniques of the present invention.

The principles of ultrasonic holography will be described with reference to FIG. 3. A liquid-filled tank 22 contains two ultrasonic transducers 24 and 26 which direct ultrasonic beams 28 and 30 of substantially the same frequency to a liquid surface 32. An object 34 containing, for example, a flaw 36, is placed in one of the beams 30 (object beam) and the other beam 28 acts as a reference beam to interact with the object beam 30 at the surface 32 to form an interference standing wave pattern 31. A point source of light radiation 38 illuminates the interference pattern or ultrasonic hologram formed at the liquid surface 32 and the hologram diffracts the illuminated light into various diffracted orders, including a zero order and two first orders, which are gathered by a lens 40 and focused to spatially displaced focal points at a spatial filter 42. The spatial filter 42 blocks all undesired diffracted orders of light and allows only one desired first order beam to pass. The unblocked first order beam, which in FIG. 3 is shown to be the +1 first order beam, contains either an actual or conjugate image of the object 34 and the flaw 36, and this image can be viewed focusing focusin an observer's eye 45, aided by a suitable eyepiece 44, on this image. The image viewed is a replica of the object beam wavefront as it passed through the object 34, transformed from an ultrasonic to an optical domain.

Holograpyic imaging preferably utilizes an area detector which will detect a standing wave resulting from interference of two ultrasonic energy beams for diffracting light incident thereon into its various diffracted orders. This is to be distinguished from the direct imaging systems wherein an area detector is called upon to give directly a visual indication of the traveling ultrasonic field striking it. For a holographic system, a liquid interface such as shown in FIG. 3 is preferred for producing a standing wave pattern and the best results have been found by using an isolation tank as described hereinafter and in copending application Ser. No. 710,893 filed Mar. 6, 1968, now U.S. Pat. No. 3,564,905. A liquid interface isolation tank is inexpensive for a wide detecting area and allows both viewing an image in real time and the making of a permanent hologram on photographic film.

It should be noted that the term "viewing optics" as used throughout this description refers to the entire optical system utilized to control the light after being diffracted by the hologram. In FIG. 3, this includes the lens 40, the eyepiece 44 and the eye 45. This is only one example of viewing optics which may be used in this invention. As an alternative, the eyepiece 44 and the eye 45 may be replaced by a photographic camera, a television camera, or other optical means.

As a part of the present invention improving ultrasonic holography, it has been discovered that the quality (resolution) of an image reconstructed and viewed directly according to the prior techniques of ultrasonic holography are effected by the size of the point light source 38 and any irregularities in the surface of the area detector 31 of FIG. 3. If a perfect point source of light is used and if the area detector is a perfect plane, the best image is obtained by focusing the viewing optics on a plane passing through an image. However, in actual practice, "point" light sources have some finite size and a liquid area detector has definite finite imperfections. It has been discovered that as the viewing optics are focused on a plane in space which becomes closer to the hologram surface and further from the position of the focused object image, and image representation will be viewed whose resolution is less adversely affected by a finite light source 38 and an irregular area detector surface 31. When the viewing optics are focused on the surface 31, a light image of the object 34 is obtained which is independent of these two image degradation factors and thus has improved resolution. Therefore, a larger light source 38 may be used to result in a brighter viewed image and further, extraordinary techniques for compensating for an irregular surface 31 need not be taken, all without affecting the quality of the viewed image of the object. Resolution of the image viewed is, of course, reduced somewhat when the viewing optics are focused somewhere in space other than on a plane passing through the focused image to be viewed. It has been found that resolution loss may be regained by use of an ultrasonic lens in the object beam, as will be explained more fully hereinafter.

Figure 4:
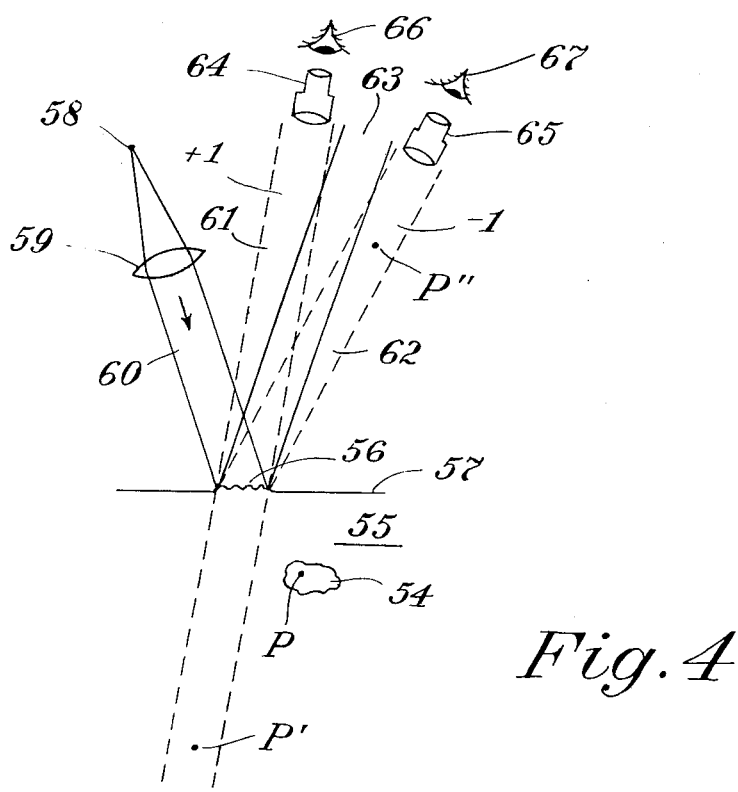
FIG. 4 illustrates an improved holographic imaging technique of this invention.

To understand more fully the operation of this technique, reference should be made to FIG. 4 wherein an ultrasonic hologram of an object 54 having a point P and immersed in a liquid 55 is being made by object and reference ultrasonic beams (not shown). The interfering object and reference ultrasonic beams form a standing wave pattern (ultrasonic hologram) 56 at the liquid surface area detector 57. A point light source 58 at the focal point of a lens 69 produces a collimated light beam 60 for illuminating the ultrasonic hologram 56. This incident light is diffracted into a +1 diffracted order 61 and a −1 diffracted order 62. A zero order beam 63 is a reflection of the incident light beam 60 from the ultrasonic hologram 56 without diffraction. The zero order beam 63 contains object information similar to that contained in the reflected light of FIG. 1. that is blocked by the filter 20. It is usually necessary to separate these diffracted orders from each other and from the zero order beam by the use of a lens 40 and spatial filter 42 as shown in FIG. 3, but for clarity of explanation, it is assumed that the image information in each of the diffracted orders of FIG. 4 may be viewed without interference from the other diffracted order or beam 258 the zero order beam. Images P' and P'' are formed in the diffracted first small diameter of light of the beam P of a object 54 and may be viewed by suitable viewing standing waves an eyepiece 64 liquid an eye 66 focused upon an diffracted and P' (or an eyepiece 65 and an eye 67 focused upon a conjugate image P'') in accordance with various techniques of ultrasonic holography before the a invention. By the filter all of this invention, the beam optics are focused on the hologram 56, thereby control an object image of improved resolution, as hereinabove described. beam-controlling The loss of resolution by focusing the viewing optics upon the hologram 56 instead of directly upon the point P' has been found not to be so great as to lose all value of the hologram surface focusing technique. The point P' of the focused image is located a distance from the hologram 56 which is related directly to either distance that the point P on the object 54 is placed away from the hologram 56, and is also directly related to the ratio of the ultrasonic wavelength to the reconstructing light wavelength. Therefore, if the point P is moved closer to the hologram surface 56, the position of the focused image P' will become closer to the hologram 56, resulting in an optical image of increasing resolution when the viewing optics are focused on this surface. The position of the object 54, however, is limited in that it cannot be placed so close to the hologram surface 56 that it gets in the way of the reference ultrasonic beam (not shown in FIG. 4). One technique for rearranging the object and reference ultrasonic transducers to allow the object to be placed closer to the hologram surface is disclosed in the aforementioned copending patent application Ser. No. 710,893.

An alternative to placing the object near the hologram detecting surface is to interpose an ultrasonic lens between the object and this surface for imaging the ultrasonic field passing through the object onto the hologram detecting surface. Apparatus for this is shown in FIG. 5. The result of using such a lens, referring again to FIG. 4, is to place the focused image P' at the hologram surface 56, the plane at which the viewing optics are focused.

Referring now to FIG. 5, an ultrasonic lens 50 is placed in the path of the object beam 30 and functions to place an ultrasonic image of the object 34 with its flaw 36 directly into the plane of the liquid surface 32. Imaging of the flaw 36 by the ultrasonic lens 50 into the ultrasonic hologram at the surface 32 is indicated by the dotted lines 52. Depending on the quality of the ultrasonic lens 50, the ultrasonic wavefront existing at the object is reproduced at the hologram surface, so that a portion of the three-dimensional image reconstructed by incident light appears to be in the hologram plane. Although the flaw image is shown to be in the plane of the surface 32, it may be that this image will lie in some other plane at an angle to the surface. An ultrasonic lens is made of a material in a configuration to bend incident sonic beams much in the same way that an optical lens refracts incident light. More information concerning ultrasonic lenses may be had by reference to the aforementioned textbook *Sonics* by Hueter and Bolt, published by John Wiley & Sons in 1955, especially to the discussion on pages 265 and 353. A lens structure having improved imaging characteristics over that of the lenses described therein is described hereinafter.

The aspect of the present invention wherein the viewing optics are focused upon the hologram surface has a further advantage in the area of color rendition ultrasonic holography as described and claimed in the aforementioned patent application Ser. no. 691,253, now U.S. Pat. No. 3,564,904. Briefly describing the technique of color rendition from ultrasonic holograms, the ultrasonic transducers utilized to produce the holograms are successively driven at mutually exclusive ultrasonic frequencies, thereby producing successive ultrasonic holograms at the hologram detecting surface. Each successive hologram can render an image in a different colored light such that a plurality of different colored images are produced in space. By bringing these different colored images into registration with appropriate magnification to make them all the same size, a composite multicolored image may be viewed. A common way to accomplish image registration is by means of lens segments provided in the viewing optics to appropriately magnify and bend the light rays of each image to common points in space. This technique of image registration often imposes certain technical problems. However, by focusing the viewing optics on the hologram surface according the present invention, this difficult optical image registration is avoided, since the various images appear in registration to form a multicolored image.

Since a focusing lens is generally utilized to spatially separate the various diffracted orders of light from an ultrasonic hologram, such as accomplished by the lens 40 of FIG. 3, it is useful to consider a specific example wherein this aspect of the present invention may apply by reference to FIGS. 6 and 6A. A lens 160 with a focal length F is placed a distance "b" from the hologram surface 166 and in the path of the diffracted and zero order beams to bring each to a point focus at a spatial filter 162. An object 164 having a point P is placed a distance "a" below the hologram surface 166. If we let "u" be the distance from the lens 160 to a desired image, "$\Lambda$" the ultrasonic energy wave-length and "$\lambda$" the light wavelength, we have the expression based upon the well-known lens formula as follows:

$$1/u + [1]/[b \pm a\,(\Lambda/\lambda)] = 1/F \qquad (1)$$

where the plus and minus signs correspond to the location of the actual image (FIG. 6) and the conjugate image (FIG. 6A), respectively. The position of an image of the holoram surface 166 is given by equation (1) where $a = 0$.

As a specific example, if the lens 160 is placed 0.1 meter from the hologram 166 and if a point P of an object 164 is placed 0.1 meter from the hologram surface 166 and the lens 160 has a focal length of 5 meters and the ratio of ultrasound wavelength to that of the reconstructing light beam 168 is 200, equation (1) will give us the positions of desired images. An image 170 of the hologram surface 166 produced by the lens 160 is calculated to lie 0.102 meters from the lens 160, as shown in both FIGS. 6 and 6A. An actual image P' of the point P of object 164 is formed by the lens 160 in the +1 first order diffraction beam a distance of 6.67 meters behind the lens 160, as shown in FIG. 6. A conjugate image P'' of point P of the object 164 is calculated to be formed 4.0 meters behind the lens 160 in the −1 first order diffracted beam, as shown in FIG. 6A. According to this invention, an eyepiece 172 and an eye 174, or an eyepiece 176 and an eye 178, should be focused on the hologram surface image 170 rendered by the lens 160, instead of on a focused image P' or p''. As point P is moved toward the hologram surface 166 as a limit, the images P' and P'' will move toward the hologram surface image plane 170 as a limit, thereby resulting in no loss of image resolution in this limiting case when the viewing optics are focused on an image of the hologram surface. Point P of the object 164 may be so moved toward the hologram surface 166 either physically, if possible, or by the use of an ultrasonic lens, as hereinbefore described.

The description with respect to FIGS. 6 and 6A has broken the optical system into its elements. Looking to the optical system as a whole, as was done earlier in this description, the "viewing optics" (including the lens 160, an eyepiece and and eye) are focused upon the hologram surface 166 in carrying out this invention.

According to another aspect of this invention, a further improvement in the techniques of three-dimensional holographic imaging has been discovered. As is well known, the reconstructing illuminating wavefront must bear a faithful relationship to the ultrasonic reference beam wavefront. This is necessary to obtain an image which is a faithful reproduction of the object as seen by ultrasound. It is easier to obtain this correspondence with a regular spherical or plane wavefront reference beam.

In a flat quartz transducer utilized to produce a reference beam, as has been illustrated hereinbefore, an irregular wavefront is thought to be caused by undesired wave elements emitted from the transducer edges. Referring to FIG. 7, a desired plane wavefront reference beam 80 is emitted by a flat quartz transducer 82 which has a round area of a diameter D and is directed through an ultrasonic transmitting medium 84 to a surface 86 thereof, which in this discussion will be shown in part as the area detector upon which a standing wave interference pattern is formed. The edge of the transducer 82 emits a non-planar wavefront 88 which spreads with distance from the transducer with an effective spread angle of $2\beta$ but the exact character of this undesired wavefront is not critical in order to correct for it.

If the transducer 82 is placed a distance y from the area detector 86 which is short enough so that the cone shaped wavefront 88 will have an effect over a very small area, a large area will be left that is affected only by the desired plane wave 80. However, this is not practical for almost all ultrasonic holography applications where the distance y must be so great that the conical beam wavefront 88 will cover the entire area desired to be used as the area detector. It is in intermediate areas where this undesired effect is at its worst and is thought to be the result of interference at the area detector between the plane wave 80 and the conical beam wavefront 88. However, it has been found that if the distance y is given by the following expression, $$y \geq (D^2 - \lambda^2)/4\lambda$$

(2)

the undesired interference effect is not too objectionable since the angle between the interfering beams 80 and 88 at the surface 86 becomes small and the transducer looks like a point source. Also, the intensity of the conical beam 88 drops off faster with increased distance than does the plane wave 80. As an example, if the transducer 82 has a diameter D equal to 2 inches and the ultrasonic frequency being emitted is about 3 Megahertz, thus having a wavelength $\lambda$ in water of about 0.02 inches, the quantity y is calculated by equation (2) to be 50 inches. Therefore, for such a configuration, the transducer 82 must be placed at least 50 inches from the liquid surface 86 to minimize the adverse effect of the conical wavefront 88, too far to be convenient for most applications.

If the ultrasonic wavefront leaving the transducer can be imaged onto or near the liquid surface 86, the result will be substantially the same as if the transducer was itself placed at the surface. An image 82' of the transducer 82 is shown in FIG. 7 which illustrates that an undesired conical beam wavefront 88' does not spread so much over the surface 86 as to affect the entire area detector. The distance between A and B on the liquid surface 86 will be free of this edge effect and may then receive an object modified beam for interference with the plane wave reference beam 80 to form a standing wave hologram with low noise.

Referring to FIG. 8, the technique of imaging a transducer 26 onto a liquid surface 90 is shown. All elements of FIG. 8 which are the same as those illustrated with respect to FIG. 5 are given the same reference numerals, the primary difference between these two figures being the existence of a lens 92 placed between the transducer 26 and the liquid surface. The focal length of the lens 92 as well as its placement with respect to the transducer 26 and the surface 90 are chosen to image the transducer into the surface. Furthermore, the image of the transduces 26 may be made larger than the transducer itself by choosing the focal length and distances appropriately. Being able to choose the size of the transducer image then allows the area of the beam 94 which strikes the surface 90 that is free of the undesired transducer edge effects as well as allowing control of the energy density striking the surface for a given transducer. The ability to make the image larger than the transducer itself allows use of a smaller transducer than would be possible without use of the lens 92, thus effecting a substantial cost saving in carrying out this invention.

Another technique for eliminating the undesirable edge effects of the transducer is to place a pinhole stop 96 at the focal plane of a lens 98, as illustrated in FIG. 9. A transducer 100 will emit a plane wave 102 including the undesirable spherical wavefront produced by the edges of the transducer. The lens 98 will bring to focus at a pinhole 104 only the plane wave component of the beam 102. The pinhole stop 96 will then block any irregular component of the wavefront such as illustrated by a ray 106. The result is a beam of energy 108 with a very regular spherical wavefront. The pinhole stop 96 should preferably be formed by a sheet of sound absorbing material such as a suitable synthetic rubber. The preferred diameter p of the pinhole 104 is approximately the resolution capability of the lens, as given by the following expression:

$$p = 2.44 \lambda (f/d)$$

(3)

where $\lambda$ represents the wavelength of ultrasound in water that is generated by the transducer 100, $f$ represents the focal length of the ultrasonic lens 98 and d represents the effective diameter of the lens 98.

It should be noted that the configuration illustrated in FIG. 9 has great flexibility since the distance between the transducer 100 and the lens 98 is determined only by convenience. Furthermore, the entire configuration may be located with respect to an area detector a distance to give coverage of the detector by the beam 108 and to determine the density of that beam where it strikes the detector. Besides producing a spherical beam 108 which eliminates the edge effects of the transducer 100, this configuration which uses a pinhole stop 96 eliminates any other distortion in the wavefront 102 which may be due to other imperfections of the transducer 100, such as a non-flat surface.

The techniques of this aspect of the invention may also be applied to improve the wavefront of other than the flat quartz transducers so far illustrated. Referring to FIG. 10, a spherically shaped piezoelectric transducer 110 with a virtual point source of ultrasonic energy 112 is shown. Such transducers often do not emit a perfect regular spherical wavefront 114 because of some irregularity in the shape of the surface of the transducer. However, by using a lens 116 placed to image the virtual point source 112 to a point at a pinhole 118 in a pinhole stop 120, a regular spherical wavefront 122 will be formed. A further advantage of using a pinhole stop is to make selection of a transducer much less critical and perhaps allowing use of transducers which are less expensive to manufacture.

Instead of a spherical shaped transducer 110 as illustrated in FIG. 10, a flat transducer with some lens element attached could be substituted therefor. The lens element would be one to convert the plane wave emitted from a flat transducer into a spherical wavefront. This technique, in combination with that illustrated in FIG. 10, allows a flat transducer of very small area to be used and still provides a desirable regular spherical wavefront for use as a reference beam.

A preferred structure and method of construction of an ultrasonic lens which may be utilized where a lens is shown in other portions of this disclosure will be described with reference to FIGS. 11 through 16A. An improved structure and method of construction of an ultrasonic lens is an further aspect of the present invention.

In most ultrasonic testing applications, the energy transmitting medium is a liquid because of high propagation efficiency and because ultrasound may be passed through a solid object under test immersed in this liquid without the high energy reflections that are encountered if air or other gas is used as the ultrasonic transmitting medium. Because of its compatibility with objects being tested, water is generally used as the liquid medium. It is in this environment, then, that a lens for imaging an ultrasonic wavefront at one plane onto another plane within the liquid medium is desired without significant aberrations or energy loss. Lenses of a solid material, such as metal or plastic, have been suggested and used in certain applications, but the energy losses, especially by reflection at the interfaces between the lens material and water, are so large as to require a high energy level of the generated ultrasonic beam. A high energy level is undesirable in many applications because of possible damage to an object under investigation, and for technical reasons. Furthermore, positive solid lenses, such as plastic used in a water medium often have too long a focal length or too high a negative radius of curvature. Therefore, lenses have long been sought that do not cause such a large energy loss but yet have good imaging qualities.

In any lens, an index of refraction $n$ may be defined as the velocity of the ultrasound in the surrounding medium, herein considered to be water, divided by the velocity of ultrasound in the lens material, which may be expressed as:

$$n = v_w / v_1$$

(4)

Ultrasound is refracted by such a lens and much of the analysis used in optics applies to ultrasonic imaging, including the following equation for determining the focal length $f$ of a bi-convex lens having surfaces with radius of curvature R:

$$1/f = [2(n-1)]/R$$

(5)

Therefore, from equation (5) it is seen that the focal length of the lens may be controlled by changing its index of refraction $n$ or its radius of curvature R.

Ultrasonic energy loss by reflection is one significant problem in designing an ultrasonic lens but can be made to be near zero if the following expression is satisfied;

$$\rho_w v_w \cong \rho_1 v_1$$

(6)

where $\rho_w$ is the density of water and $\rho_1$ is the density of the lens material. Solid materials popularly used for lenses do not satisfy this requirement and therefore have an energy loss by reflection of from 12 to 60 percent, as more fully described in the aforementiond book Sonics, page 265.

Figure 11:
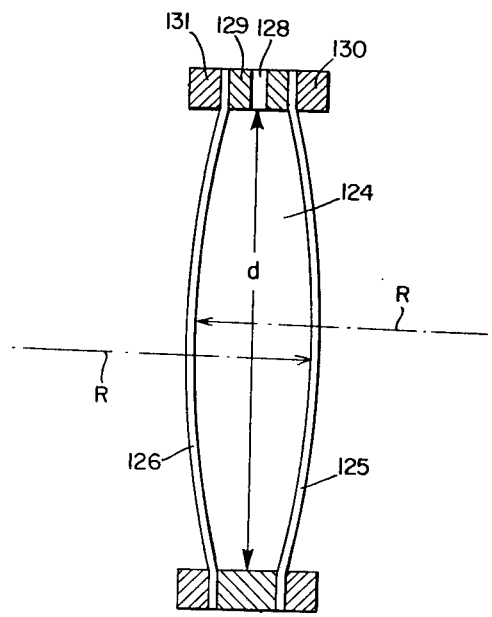
FIG. 11 illustrates in cross-section a preferred ultrasonic lens.

This high reflection loss characteristic of solid lenses has been significantly reduced by using a liquid lens in a configuration such as that shown in FIG. 11, wherein an available liquid 124 having a $\rho v$ product very nearly equal to that of water or other surrounding liquid medium is enclosed in two spherical shells 125 and 126. Such lenses have been made with the liquid 124 being carbon tetrachloride and the enclosing shells 125 and 126 being made of thin metal. The reflection and absorption losses of the shells are minimized by making them very thin in relation to the wavelength of ultrasound in the shell material. This thickness should be either less than ¼ wavelength in the shell material or an integral number of one-half wavelengths. The thinner the material, the smaller the losses. Losses are also related to the $\rho v$ product match of the shell material with that of water. It has been found that shells made of metal material are not preferred because their $\rho v$ product is not matched to that of water and thus requires a very thin material in relation to the wavelength to keep the losses within a tolerable level. For high frequencies, such as those within the range of 1 to 10 MHz. there is a very small wavelength so that a metal shell having only small losses must be so thin it is not structurally sound.

A restriction imposed by the use of metal shell material at any wavelength is that it must be formed with a particular radius of curvature for a desired focal length which cannot be altered. It has been suggested to make an ultrasonic lens using a flexible material such as rubber, for the shells 125 and 126, which are held firmly against an inner supporting ring 129 by outer supporting rings 130 and 131. The liquid material 124 is then introduced through an opening 128 to expand the rubber shells 125 and 126 into a desired focal length. This incorporates the variable focal length feature which is desired in many applications. However, this rubber material is not satisfactory because it cannot be made thin enough to reduce energy losses and still maintain a desired shape, especially at the higher ultrasonic frequencies. It has been discovered that if the shells 125 and 126 are made from thin polymeric membranes, the shells may be made very thin relative to the ultrasonic wavelength used and still maintain strength and resistance to creep over time. Also, most polymeric materials have a favorable $\rho v$ product in comparison with water, which means that the membranes need not be made so thin, as compared to metal, in order to obtain the same degree of transmission efficiency to ultrasound. Furthermore, polymeric films will stretch, which allows making a lens with a variable focal length depending on the volume of liquid material 124 placed in the cavity between the shells 125 and 126.

As with optical lenses, the ultrasonic lens of FIG. 11 will have spherical aberrations that are undesirable.

These can be minimized, however, by making the radius of curvature of the shells 125 and 126 very large with respect to the effective diameter d of the lens, thereby to produce a "thin" lens. It has been found that good quality ultrasonic images may be obtained if the radius of curvature R is at least four times the diameter d which then requires an index of refraction $n$ to be in excess of 1.5 in order to produce a lens with sufficiently short focal lengths. The problems of a high negative curvature required for solid lenses of metal or plastic do not exist with a liquid filled lens because liquids are available with a high index of refraction. A preferred liquid material 124 has been found to be trichloro-trifluoro-ethane which has an index of refraction $n = 2.07$ and a good $\rho v$ match for low reflection losses when the lens is used in water at room temperature. Other halogenated hydrocarbon compounds that have been found to be useful for the sound refracting fluid of this lens are as follows: Carbon tetrachloride, chloroform, ethyl bromide, ethyl iodide, methyl bromide, and methyl iodide.

Figure 12:
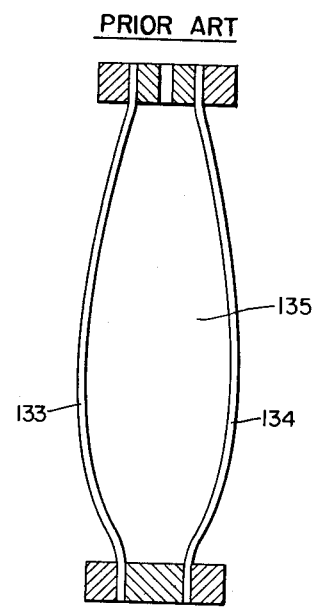
FIG. 12 demonstrates a problem in maintaining quality of an ultrasonic lens according to FIG. 11.

It has been discovered that if the shells 125 and 126 made of a polymeric membrane are merely attached to the ring members 129, 130 and 131, the introduction of a liquid 124 between the membranes will cause them to expand but not to form a satisfactory spherical surface. As shown in FIG. 12, the membranes 133 and 134 become "baggy" because the liquid 135, being much denser than water or other surrounding medium in order to maintain low losses, produces a pressure along the bottom of the lens as shown in exaggerated form. If a gas filled lens is used in air, this problem is not presented. The seriousness of the problem with liquids can be emphasizes by pointing out that deviation of the membranes 133 and 134 from that of a spherical surface of only about one wavelength will cause serious distortions in the images obtained with this lens. This may be solved by using the lens in a horizontal position where the membranes 133 and 134 would maintain the spherical shape, although perhaps not of the radii desired, but this is an undesirable limitation to place on the use of an ultrasonic lens, especially in the applications discussed hereinafter. This bagging effect may also be remedied somewhat by expanding the volume of fluid 135 and thus stretching the membranes 133 and 134 sufficiently so that they form a good spherical surface. However, a lens is then formed that has severe spherical aberrations because of a small radius of curvature relative to the lens diameter. It has been discovered that if the membranes 133 and 134 are stretched before they are mounted into the supporting rings, a thin lens may be constructed without the bagging effect shown in FIG. 12 and thus will produce images of improved quality.

Figure 13:
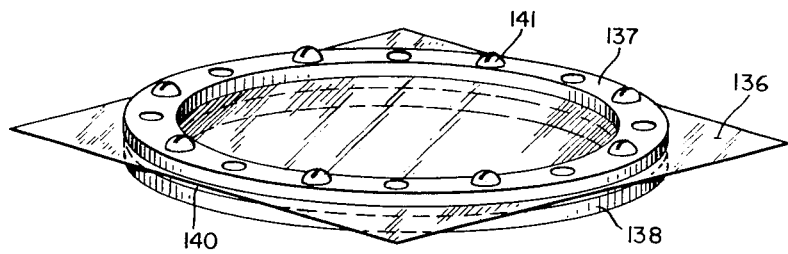
FIGS. 13, 13A and 13B illustrate a method for making an improved ultrasonic lens according to this invention.
Figure 13A:
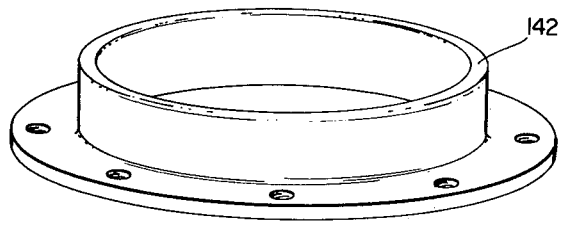
Figure 13B:
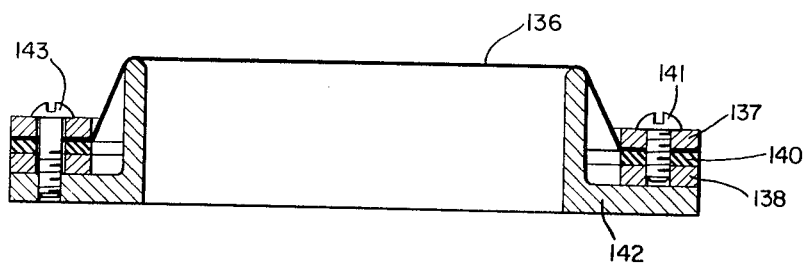

With reference to FIGS. 13, 13A and 13B, a method for prestretching the lens membranes is illustrated. A thin sheet of polymeric material 136 (or other material satisfying the requirements hereinabove discussed) is clamped between two rigid metal rings 137 and 138 along with a gasket 140. The inside diameter of the ring should be significantly larger than the diameter of the lens to be made, as will be apparent hereinafter. The rings 137 and 138 are clamped firmly together by several screws 141. This assembly is then placed over a ring 142 and fastened tightly thereto by screws 143, thereby stretching the polymeric film 136. A center supporting ring 144 and an outer supporting ring 145 are then clamped on either side of the polymeric film 136 to form a portion of the lens structures shown in cross-section in FIG. 14A. These two rings are held tightly together by several screws 147. A second polymeric film 148 may then be stretched in the same manner as shown with respect to FIGS. 13, 13A and 13B and clamped between the center support ring 144 and an outer support ring 149 by the use of screws 150.

Figure 14:
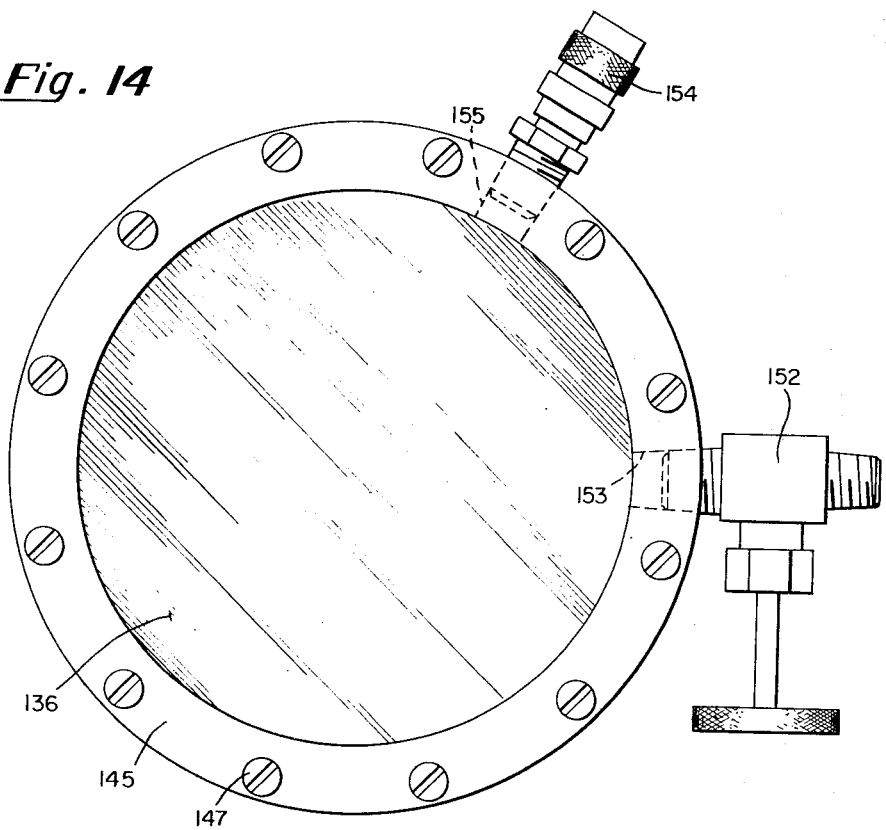
FIGS. 14 and 14A show the construction of an improved ultrasonic lens according to this invention in a preferred embodiment.
Figure 14A:
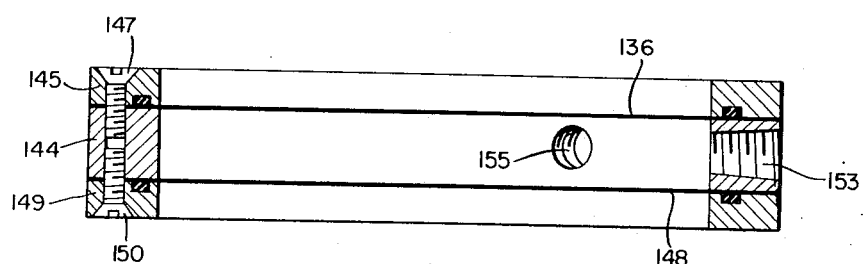

FIG. 14 shows the completed lens in plan view. A needle valve 152 is threadedly attached to the interior of an opening 153 of the center support ring 144 to control the flow of fluid into the cavity formed between the polymeric films 136 and 148. As fluid is fed through this valve into the cavity, air may be let out by opening a bleeder valve 154 which is threadedly attached to the central support member in an opening 155. When all the air has been exhausted from the cavity, the bleeder valve 154 is closed and fluid is forced through the needle valve 152 until the polymeric membranes 136 and 148 take on a spherical shape with a desired radius of curvature.

Figure 15:
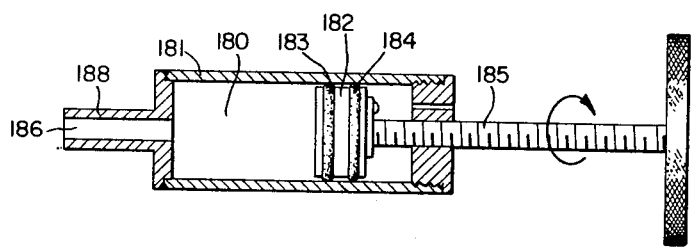
FIG. 15 shows apparatus for controlling the quantity of fluid within the ultrasonic lens of FIGS. 14 and 14A.

FIG. 15 illustrates a plunger which may be used for controlling the amount of fluid placed into the lens. A chamber 180 is formed by housing 181 which includes a plunger 182 having O-rings 183 and 184 to form a seal. A shaft 185 threadedly attached to an end of the housing 181 provides reciprocal power to the plunger 182 to force liquid out of the chamber 180 through the tube opening 186 of the tube 188. This plunger assembly may be permanently connected through tube 188 to the needle valve assembly 152 to allow control of the amount of fluid in the lens and thereby its focal length.

In constructing a lens with this novel pre-stretching step, the material chosen for the membranes should have a high yield point and should be pre-stretched so that when in the final lens and stretched further by fluid pressure from within, the stress within the membrane will be close to its proportional limit. This will improve conformity to a spherical shape.

Several polymeric films are available commercially which are suitable for the membranes. Typical polymeric films include: polyesters (e.g., polyethylene terephthalate), polyamides (e.g., the polyimide of pyromellitic acid and bis (4–aminophenyl), ether), fluorocarbon polymers and copolymers (e.g., the copolymer of tetrafluoroethylene and hexafluoropropylene), polyvinyl fluoride, polyvinylidene, chloride polyolefins, and the like. The polymeric film may be heat-shrinkable if desired, such as heat-shrinkable polyethylene terephthalate film. Also, the film may be made of cellulose acetate which is normally prepared by solvent casting without orientation.

Although the improvement has been described to be a double concave lens, it should be understood that many variations are possible in the form of the lens while still taking advantage of the improved combination of materials and methods of conducting the lens of this invention. For instance, a double concave lens could be constructed, as outlined above, except that when all the air is driven from the cavity between the two membranes 136 and 148 of FIG. 14A, fluid would be withdrawn. The surrounding water or other ultrasonic transmitting medium will supply the necessary pressure of the membranes to take on concave shapes dependent upon the volume of liquid remaining therebetween. Furthermore, a lens may be constructed according to the improvements of this invention with only one membrane. The other member enclosing the lens fluid may be a solid element or even a transducer.

A membrane may also be placed under stress after lens manufacture by a heat-shrinking technique. The desired volume of lens fluid is placed in a lens cavity defined by shells of heat-shrinkable polymeric films. Heating the films develops stress required for a spherical lens shape.

Figure 16:
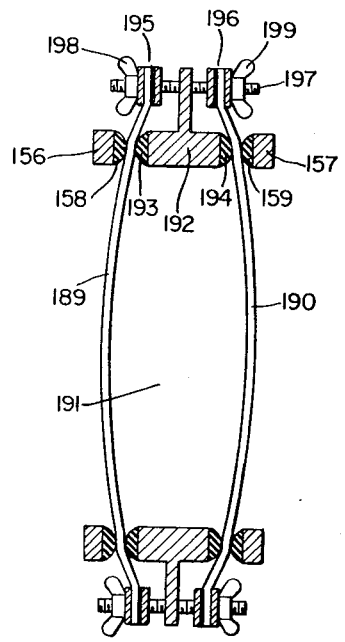
FIG. 16 illustrates in cross-section an ultrasonic lens according to another embodiment of the present invention.

A further technique for stretching membranes according to this invention is shown in FIG. 16. Membranes 189 and 190 form a cavity 191 therebetween along with the middle support ring 192 and gaskets 193 and 194. The membrane 189 and 190 are held in ring assemblies 195 and 196 similar to that shown in FIG. 13, and are attached through a threaded member 197 to the center ring support 192. The center ring support 192 and the membranes 189 and 190 are placed loosely together in forming this lens and then a specific volume of liquid is introduced into the cavity 191. Wing nuts 198 and 199 are then turned to stretch the membranes until a lens is formed having spherical surfaces. Additional ring clamps 156 and 157 having gaskets 158 and 159 are added to improve the seal of the volume 191. This embodiment of the invention also allows further stretching of the membranes after the lens has been formed to compensate for creep.

Figure 16A:
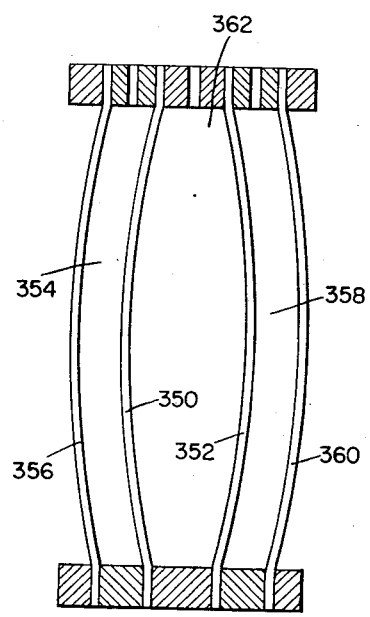
FIG. 16A illustrates in cross-section an ultrasonic lens according to a further embodiment of the present invention.

A further embodiment of this invention is shown in FIG. 16A where a lens refracting liquid 362 is placed between two membranes 350 and 352 which have been pre-stretched as hereinabove described. A volume 354 is formed by adding a third membrane 356. A third chamber 358 is formed by adding a fourth membrane 360. The chambers 354 and 358 are filled with the same liquid in which the lens is immersed, which will most often be water, so there is no refracting of sound at the interfaces formed by the membranes 356 and 360. The purpose of these two added chambers is to place pressure upon the membranes 350 and 352 to compensate for the pressure of the sound refracting fluid 362. If the pressure in both chambers 354 and 358 is made the same, the result will be a lens with the same imaging properties as those discussed hereinabove, but will have the advantage that the membrane 350 and 352 will be less likely to creep over a period of time. Furthermore, if the pressure in chambers 354 and 358 are made unequal, the membranes 350 and 352 will take on a radii of curvature that are not equal, therefore giving possibility to make a lens with further correction for spherical aberration.

In the alternative, the configuration of FIG. 16A could be used for a multi-element lens for aberration correction. Sound refracting liquid may be inserted in the chambers 354 and 358 as well as or in place of within the chamber defined by the membranes 350 and 352. The liquids placed in these three chambers may have different or similar refractory properties depending upon the desired result. Furthermore, one or more of the membranes may be made to make different directions of curvature than the directions shown in FIG. 16A by adjusting the relative volumes of liquid in the three chambers.

Throughout this description, it has been assumed that a lens will be made that is spherical but it should be understood that the techniques of this invention have equal applicability to a cylindrical lens or one of some other shape that such a stressed membrane will tend to assume when its edge is held in a particular manner and filled with a desired volume of liquid.

An improved technique will now be described for using ultrasound to image the internal structure of a woman's breast in order to detect a growth therein, such as abnormal cancer tissue, by use of either two-dimensional direct imaging or three-dimensional holographic imaging. Breast testing has generally been accomplished by X-ray techniques which have certain limitations because of a possible health hazard and because the resulting picture of the breast only indicates density variation which gives a limited amount of information. Pulse echo ultrasonic methods have been used for imaging the female breast, as mentioned hereinabove, but this has certain limitations since a real time view of the entire breast in one picture is not possible.

In the ultrasonic technique described herein, a beam of ultrasonic energy penetrates the entire breast and results in an optical image of the ultrasonic field passing through the breast. This image indicates more than mere density variations of the breast; it also shows differences in molecular binding as well. This technique allows detection of cancer or other abnormal internal growths in earlier stages of growth than do other methods. Although three-dimensional holographic imaging of the female breast is preferred, the invention may also be practiced to advantage with two-dimensional direct imaging methods.

Figure 17:
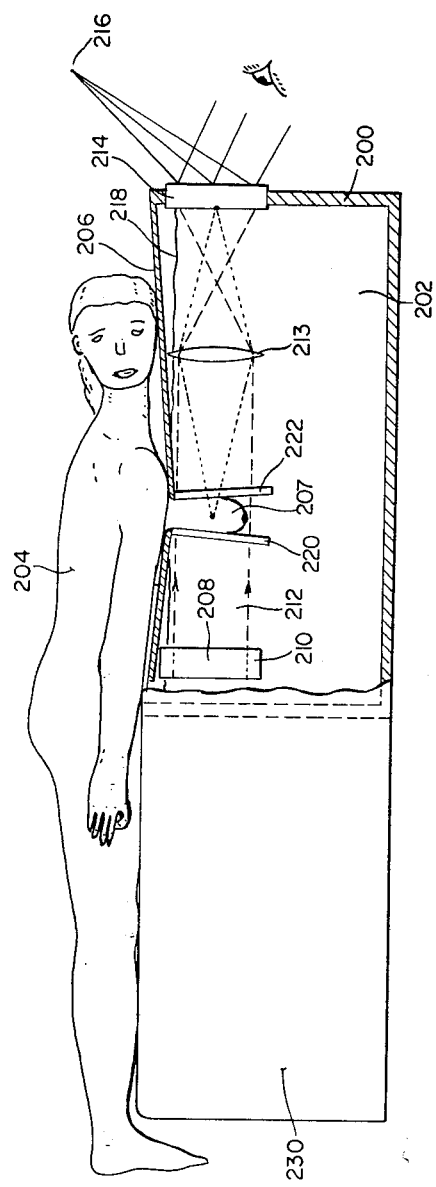
FIG. 17 illustrates mammograph equipment utilizing direct ultrasonic imaging techniques.

Since ultrasound is heavily attenuated in a gas such as air and is further heavily reflected when passing from air to a solid object, a female breast is best imaged by submersing it in an ultrasonic transmitting liquid medium of high efficiency. This medium should be compatible with the female breast so that no more than a small proportion of energy will be reflected as the ultrasound passes from the liquid medium to the breast and through to the liquid medium again. It has been found that water is quite satisfactory and, of course, available in large quantities and is further comfortable for the patient. To avoid having to submerse more of the patient in the water than the breast under examination, it has been found preferable to position the woman in a horizotnal position and extend the breast under examination down through a top surface of the water and pass the ultrasonic energy beam substantially parallel to the water surface through the breast. FIG. 17 illustrates this preferred technique. A tank 200 contains an ultrasonic transmitting water 202 and a woman 204 is held in a prone position over the tank by a supporting surface 206. A breast 207 under examination is suspended into the water 202 through an opening in the supporting surface 206. A quartz transducer 208 held in place by a housing 210 is a preferred source of a substantially plane wave ultrasonic beam 212 which is propagated through the water 202 to the breast 207. The ultrasonic wavefront passing through the breast is imaged by an ultrasonic lens 213 onto an ultrasonic detector such as the area detector 214 which is shown to be of a type such as a Pohlman cell. A light source 216 illuminates the observer's side of the area detector 214, thereby displaying in the optical domain a representation of the ultrasonic wavefront which has passed out of the breast 207. It should be understood that the area detector 216 may be any other known device for converting ultrasonic wavefront variations into the optical domain, such as the ultrasonic camera hereinbefore described.

A primary consideration in the configuration shown in FIG. 17 is to allow room for the transducer housing 210 above a surface 218 of water filled container 200 which then permits the ultrasonic energy beam 212 to be propagated very close to the surface 218 and thus image a large portion of the breast 207 without having to immerse any more of the woman into the water. To allow as much of the breast 207 as possible to be placed into the liquid 202, the supporting surface 206 has been sloped from both directions to the breast opening.

It has been discovered that the best imaging is obtained if the breast 207 is held down away from the chest cavity of the patient so that as much of the breast is in the path of the ultrasonic beam 212 as possible. It is also desirable that the breast is flattened to minimize the maximum thickness and held immobilized during the examination. This has been found to be satisfactorily accomplished by a breast holder which includes two supporting plates 220 and 222 which serve to keep the breast 207 under gentle compression during the examination. As may be better seen by reference to FIG. 18, the plates 220 and 222 each support thin films 224 and 226 which are substantially transparent to the particular ultrasonic wavelength being used. These sheets 224 and 226 are preferably a suitable polymeric film and should be stretched to be held under tension. The frame 222 is rigidly attached to the patient supporting member 206 and the frame 220 is attached to a separate plate 228 which is held in a slideable relationship with the other components so that it may be adjusted on each individual patient. The plates 220 and 222 are preferably at an angle with the supporting member to compress the breast more in the portion near the chest cavity than in the remaining portions of the breast in order to hold it out away from the chest cavity as much as possible. However, this angle should not be so great as to cause the breast to have a considerably uneven thickness across the ultrasonic beam 212 and it has been found that an angle somewhere around 10° from the perpendicular with the supporting member 206 is preferred, as shown in FIG. 18.

A preferred range of frequencies of the ultrasonic energy beam 212 has been found to be between 1 and 10 Megahertz (MHz). Below 1 MHz., resolution has been found to be inferior, and above 10 MHz. a breast is not transparent to the ultrasonic energy. An operating frequency of 3 MHz. has been found to be preferred for breast examination. The transducer 208 is preferably an X-cut quartz crystal with a 1 MHz. fundamental frequency which is operated at 3 MHz. by a power supply at that frequency, according to well-known techniques. The power supply equipment could be housed within the examination equipment next to the tank 200 in an area 230 of FIG. 17.

Figure 18:
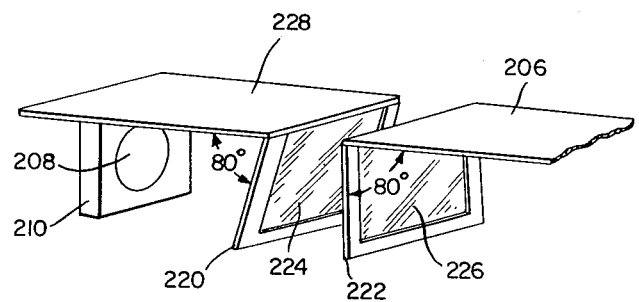
FIG. 18 is an expanded view of the breast holder utilized in FIG. 17.

The technique described with respect to FIGS. 17 and 18 provides for real time examination of a breast. This has the advantage that the breast may be properly positioned and flattened and other parts of the apparatus adjusted, such as the ultrasonic lens 213, in order to give a good image that is of value for medical diagnostic work.

The preferred technique for ultrasonic breast imaging utilizes the techniques of wavefront reconstruction of holography, as hereinabove described. Apparatus for carrying out the holographic technique is illustrated, particular in schematic form, in FIGS. 19, 20 and 21. Since these Figures are different views of the same apparatus, common reference numbers have been used for all views.

An object beam quartz transducer 232 film, by a holder 234 generates an object beam of ultrasonic energy 236 which passes through a breast 238 positioned between two breast holding plates 240 and 242. The wavefront leaving the breast is imaged by an ultrasonic lens 244 onto an isolation tank 246 which is the area detector. A thin membrane 248 which is transparent to the ultrasonic frequency used, and is preferably a polymeric film, separates the water 250 from the tank of water 252 but allows ultrasonic energy to travel therebetween without significant attenuation. A mirror 254 capable of reflecting an ultrasonic beam of the frequency being used without significant attenuation is placed to direct the horizontal traveling ultrasonic object bearing beam 256 into the horizontal isolation tank 246. A glass sheet 0.5 inch thick has been found satisfactory for the mirror 254.

A reference beam 258 of ultrasonic energy at a frequency substantially that of the object beam 236 is generated by a quartz transducer 260 supported in a holder 262. The transducer 260 is imaged by an ultrasonic lens 264 onto the isolation tank 246. A thin stretched membrane 266 is provided to pass the reference beam between the two tanks of liquid 250 and 252. A mirror 268 is positioned to reflect the horizontally traveling beam into the isolation tank 246. An ultrasonic frequency of approximately 3 MHz. is preferred for both the object and reference beams and may be generated, if desired, by driving the transducers 232 and 260 by a common power supply.

The object bearing beam 256 and the reference beam 258 interfere with each other to produce standing waves in a liquid surface of the isolation tank 246. The standing wave pattern substantially capable of diffracting light into various image-carrying orders. For best results, it completed been found that ultrasonic beams 256 and 258 should interefere at an angle of approximately 60° with one another when the frequency utilized is 3 MHz. For different frequencies and other varying circumstances, the reflectors 254 and 268 may be changed in orientation relative to one another along with moving the isolation tank 246 either up or down relative to the reflectors.

The area detector is a thin film of liquid 270 held within the isolation tank 246 by a round flame 272 and is separated from the water 252 by a thin membrane 274 stretched across the frame 272. The thin liquid film 270 is preferably one having a viscosity substantially greater than that of water so that the standing wave pattern formed on its surface will not be disturbed by minor mechanical vibrations, fluorocarbon being preferred. The thin stretched membrane 274 is preferably made of a low-gloss black polyvinyl chloride film which is transparent to ultrasound.

Figure 21:
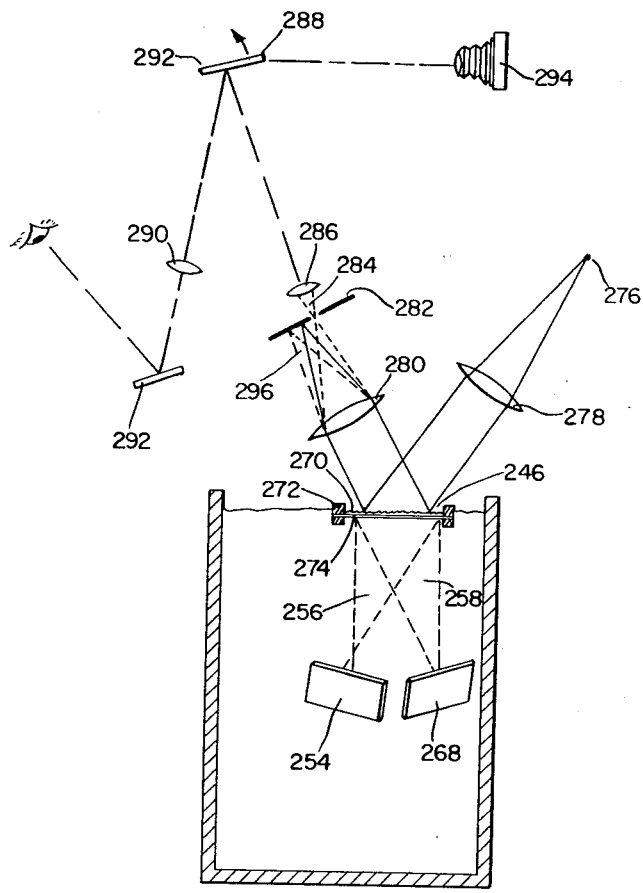
FIG. 21 is an end view of FIG. 19 taken at section 21—21 which additionally illustrates schematically an optical system for reading out a three-dimensional image.

The standing wave pattern formed on the surface of the thin liquid film 270 as a result of the interference of the object bearing beam 256 and the reference beam 258 may be optically read as illustrated in FIG. 21. A substantially monochromatic light source 276 of small diameter is controlled as to beam spread by a lens 278 to illuminate substantially all of the standing waves formed on the liquid surface 270. This light is then diffracted and its various orders are separated by a lens 280 so that a spatial filter 282 may be placed where these various orders of diffracted light come to a point focus and filter all but one first order beam 284. A lens 286 may be desired to control this light which is directed to a mirror 288, through another beam-controlling lens 290 to another mirror 292 to provide a three-dimensional breast image-carrying wavefront in a convenient location for real time observation. In the alternative, the mirror 288 may be pivoted about an end 292 into a location to reflect the first order diffracted light beam 284 into a camera 294 to make a photograph of the image of the internal breast structure. In either case, the viewing optics are focused on the portion of the three-dimensional image desired to be viewed. If the viewing optics be focused on a plane passing through the image which is coincident with the liquid surface 270, the size and wavelength requirements of the light source 276 are reducd as hereinbefore discussed in detail.

If a permanent hologram is desired so that a three-dimensional image of the internal breast structure can be reconstructed at some future date, an image-carrying first order diffracted beam 284 (the light source 276 is now made to be a coherent one) is interefered with an off-axis reference beam coherent with the source 276 and a photographic plate is exposed to this interference pattern. When developed, the photographic film is a permanent hologram which alows an image of the breast structure to be reconstructed by shining a substantially monochromatic light through the film. As an alternative to using a separate reference beam to make a permanent hologram, a second first order diffracted beam 296 could be caused to ineterfere with the first order diffracted beam 284 with the reference pattern recorded on film, but the results are not preferred in many circumstances.

Figure 22:
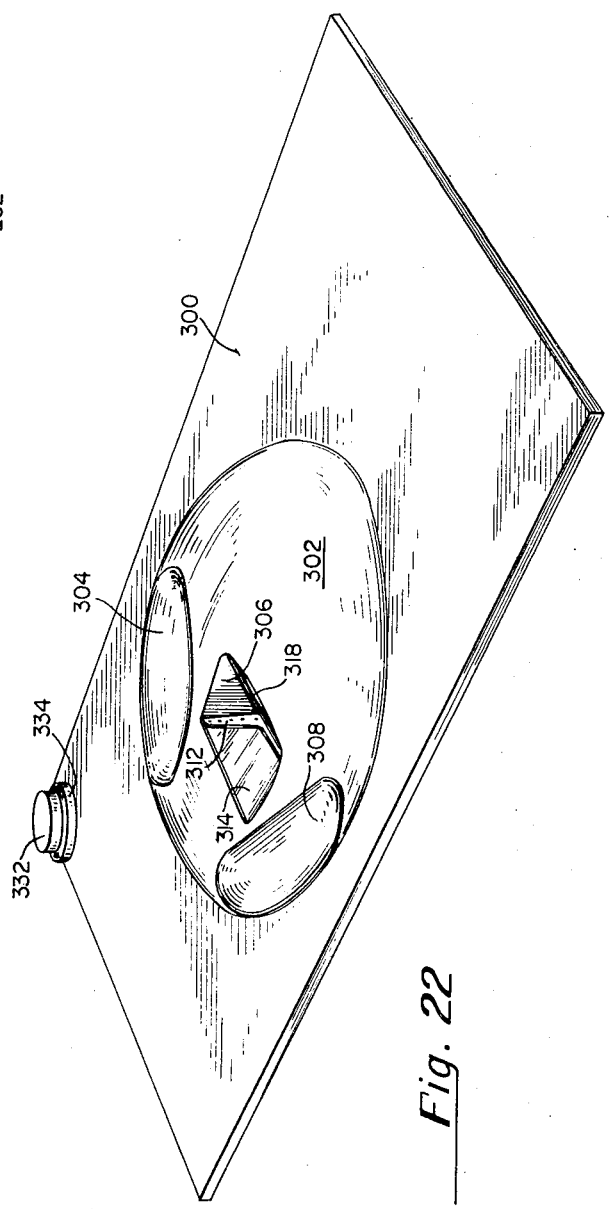
FIG. 22 shows a preferred patient support plate which may be used in the ultrasonic mammograph apparatus of FIGS. 17 and 19.
Figure 23:
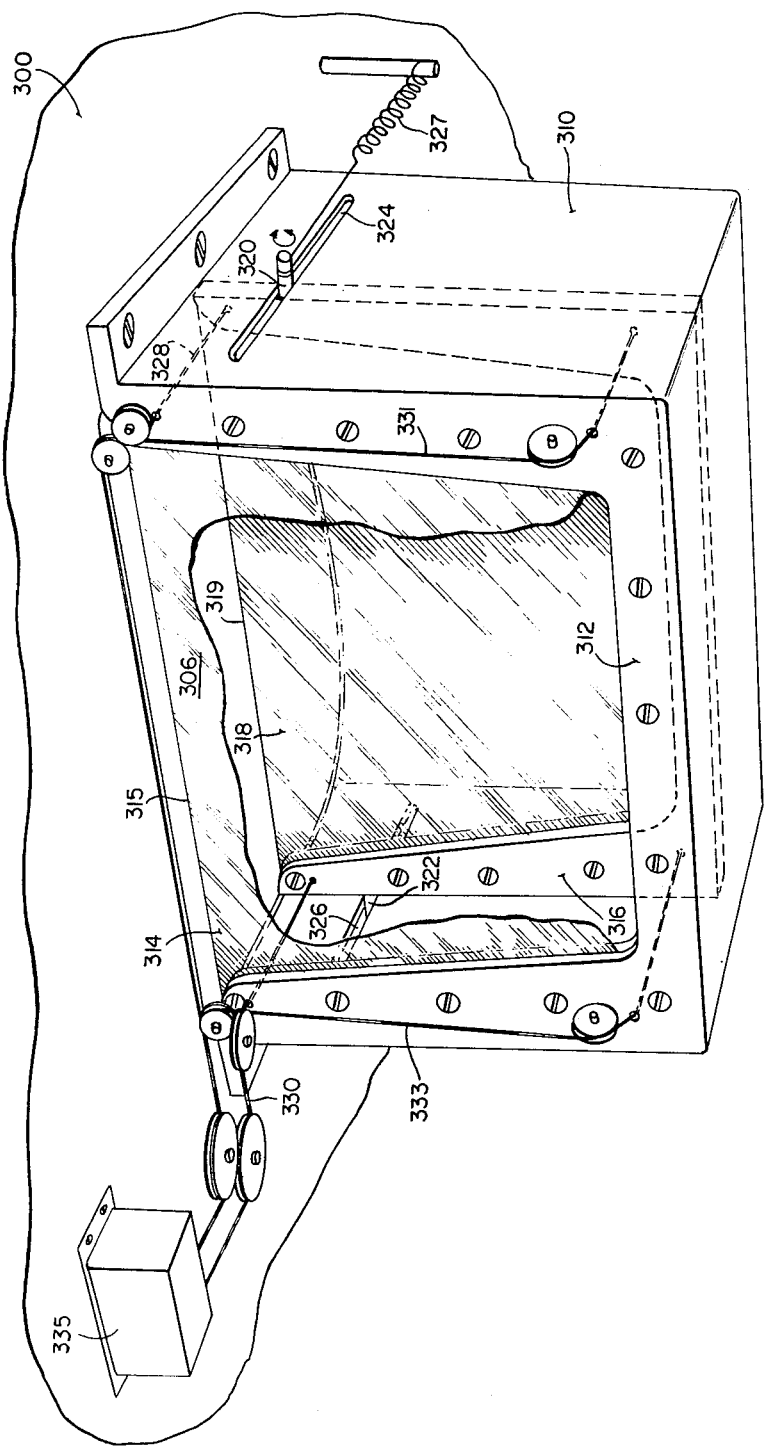
FIG. 23 is a breast holder which is preferred for use in the ultrasonic mammograph equipment of FIGS. 17 and 19.

Referring to FIGS. 22 and 23, a preferred patient support surface and breast holding mechanism, respectively, are illustrated for use with either two-dimensional circuit imaging or three-dimensional holographic imaging. A patient support surface 300 of FIG. 22 has a depressed surface area 302 for allowing the patient's chest cavity to be placed close to the liquid medium below and her breast placed in the liquid through an opening 306. A further depression 304 in the depressed surface 302 is designed for the patient's right shoulder so that she may lie slightly on her right side and thereby cause her rib cage to contact the edges of the opening 306 for most of the breast's perimeter. This firm contact is necessary to prevent the breast from slipping up and out of the holder below. In a similar manner, another surface depression 308 is provided for the patient's left shoulder to facilitate placing her left breast as far through the opening 306 as is possible without slipping out of the holder.

Surrounding the opening 306 on the underneath of the support surface 300 is a breast holder of preferred construction which can be seen in detail by reference to FIG. 23 and which is claimed in a copending application by Henry J. Jones, filed simultaneously with the present application. A box-like frame 310 has as one end thereof a U-shaped support plate 312 which holds a thin membrane 314 in tension. This membrane should be substantially transparent to the ultrasonic frequency being used. The membrane 314 is preferably a polymeric film such as a polyester, polyethylene or polypropylene. A second U-shaped support plate 316 holds a similar membrane 318 in a stressed condition. The support plate 316 is placed within the frame 310 to form a breast cavity between the membranes 314 and 318. The support plate 316 further has cylindrical guide members 320 and 322 attached to opposite sides thereof. These cylindrial members are mounted within guide slots 324 and 326 of the frame 310 in a manner so that the support plate 316 may be rotated about the center line common to the cylindrical members 320 and 322 and further to be slideable along the two guide slots 324 and 326.

The support plate 316 is resiliently held away from the support plate 312 by a spring 327 connected between the cylindrical member 320 and the underside of the support surface 300, and a second spring (not shown) between the cylindrical member 322 and the support surface 300. When a breast is positioned between the membranes 314 and 318, the support plate 316 is drawn toward the support plate 312, thereby placing the breast under compression. This movement is made by operating a control knob 332 which is operably connected through a control gear box 335 with the upper side of the U-shaped plate 316 by means of ropes 328 and 330. Similarly, motion from the turning of the control knob 334 is communicated to the bottom edge of the U-shaped plate 316 by ropes 331 and 333 through the control gear box 335. Several pulleys are shown over which these four ropes move between the support plate 316 and the gear control box 335.

To operate the breast holder, movement is applied to the ropes 328 and 330 initially to draw the top edge of the membrane 318 against the breast, threby to hold the breast away from the chest cavity without slipping out of the holder when the rest of the breast is placed under compression. Motion is then applied to the ropes 331 and 333 to pull the bottom portion of the membrane 318 against the breast to hold it at approximately uniform thickness over the area through which ultrasound is projected.

The membranes 314 and 318 have beads 315 and 319, respectively, along their open edges for contacting and conforming to the varied curves of the chest wall. These beaded edges are held taut to increase the initial pinch effect which prevents the breast from creeping up and out of the holder.

When the breast is so immobilized, ultrasonic energy is passed through the breast and into its two surrounding membranes 314 and 318 without passing through the rib cage and then imaged onto an area detector as hereinabove described. When the examination is complete, the support plate 316 is released from compression. This may be accomplished by some mechanism within the control gear box 335 to release tension on the ropes.

It shall be understood that the invention described herein is not limited to the specific arrangements shown and that changes and modifications may be made within the scope of the appended claims.

What is claimed is:

1. A method of constructing an ultrasonic lens of desired constant radius of curvature for use in a liquid ultrasonic transmitting medium, comprising the steps of:

a. mounting a polymeric film in a ring structure, the inside diameter of the ring structure being larger than the diameter of the ultrasonic lens to be constructed, b. pre-stretching the polymeric film while held by the ring structure by insertion of a cylindrical ring to put tension upon said polymeric film, c. clamping supporting ring structure of the lens to said polymeric film while said film is held under tension in pre-stretched condition, d. forming a lens cavity with said prestretched film as one wall thereof, and e. filling said cavity with a volume of ultrasonic refracting liquid such that the polymeric film will be further stretched within its elastic region an amount so that it will be substantially at its proportional limit after the step of filling the cavity is completed to form an ultrasonic lens having a film surface of desired constant radius of curvature.

2. A method according to claim 1 wherein the polymeric film has a thickness that is an integral multiple of half-wavelengths of ultrasonic energy in said film.

3. A method according to claim 1 wherein the polymeric film comprises polyethylene terephthalate.

4. A method according to claim 1 wherein the ultrasonic refracting liquid of the lens comprises a halogenated hydrocarbon.

5. A method according to claim 4 wherein said halogenated hydrocarbon includes liquid trichlorotrifluoroethane.

6. A method according to claim 1 including the step of pre-stretching a second polymeric film and clamping it to said supporting ring structure while said second film is in pre-stretched condition to form the lens cavity between the two pre-stretched polymeric films.

7. A method according to claim 6, including the steps of pre-stretching third and fourth polymeric films and attaching them to the supporting ring structure of the lens on either side of the first and second films to form second and third cavities, filling said second and third cavities with a liquid whereby the stress within each of said third and fourth films is close to the proportional limit, said liquids in said cavities being chosen to have ultrasonic refracting characteristics relative to each other and relative to the liquid ultrasonic transmitting medium to give a multi-element lens with a desired characteristic.

8. A method according to claim 7 wherein the liquid within said second and third cavities is the same as the liquid ultrasonic transmitting medium.

9. An ultrasonic lens of constant radius of curvature comprising:

a ring structure having an axial depth forming a lens cavity, pre-stretched polymeric films secured to said ring structure and forming as opposite walls of said lens cavity opposing surfaces of said lens, and ultrasonic refracting liquid within said cavity in quantity which stretches said polymeric film within its elastic region by an amount which maintains it substantially at its proportional limit, said polymeric films having a selected constant radius of curvature determined by said quantity of refracting liquid within said cavity, said polymeric films being characterized by the pre-stretching thereof to that point which maintains them substantially near their proportional limits when additionally stretched by said refracting liquid to form said constant radius of curvature.

* * * * *

UNITED STATES PATENT OFFICE
CERTIFICATE OF CORRECTION

PO-1050
(5/69)

Patent No. 3,802,533      Dated April 9, 1974

Inventor(s) Byron B. Brenden

It is certified that error appears in the above-identified patent and that said Letters Patent are hereby corrected as shown below:

Column 5, line 18, after the word "viewed" insert --by--; same line delete "focusin";

line 24, correct the spelling of "Holographic";

line 66, change "and" to --an--.

Column 6, line 40, delete "beam 258" and insert --by-- before the word "the";

line 41, delete "small diameter" and insert --orders--;

line 42, delete "beam" and insert --point--; same line change "a" to --the--;

line 43, delete "standing waves" and insert --optics--; same line before "an" insert --such as--; same line after 64 delete "liquid" and insert --and--;

line 44, delete "diffracted and" and insert --actual image--;

line 46, delete "various" and insert --the--;

line 47, delete "a" and insert --present--; same line delete "filter" and insert --technique--;

line 48, delete "all"; same line change "beam" to --viewing--;

line 49, delete "control" and insert --providing--;

line 50, delete "beam";

line 51, delete "controlling";

line 57, delete "either" and insert --the--.

(contd)

UNITED STATES PATENT OFFICE
CERTIFICATE OF CORRECTION

Patent No. 3,802,533  Dated April 9, 1974

Inventor(s) Byron B. Brenden

It is certified that error appears in the above-identified patent and that said Letters Patent are hereby corrected as shown below:

Page 2 (contd)

Column 8, line 21, correct the spelling of --hologram--;
        line 42, "p''" should be --P''--;
        line 56, the second "and" should be --an--.
Column 10, line 5, correct the spelling of --transducer--.
Column 12, line 11, correct the spelling of --aforementioned--.
Column 15, line 19, change "specific" to --specified--.
Column 16, line 66, change "216" to --214--.
Column 18, line 5, change "film" to --supported--;
        line 38, change "substantially" to --is--;
        line 41, change "completed" to --has--.
Column 19, line 28, correct the spelling of --allows--;
        line 33, correct the first part of the word --interfere-
        line 35, change "reference" to --interference--;
        line 40, change "circuit" to --direct--;
        line 60, change "Henry J. Jones" to --Henry S. Jones--.

Signed and sealed this 22nd day of October 1974.

(SEAL)
Attest:

McCOY M. GIBSON JR.
Attesting Officer

C. MARSHALL DANN
Commissioner of Patents